(12) United States Patent
Luo

(10) Patent No.: US 6,772,080 B2
(45) Date of Patent: Aug. 3, 2004

(54) SYSTEM AND METHOD FOR KINEMATIC CONSISTENCY PROCESSING

(75) Inventor: Jia Luo, Issaquah, WA (US)

(73) Assignee: The Boeing Company, Seattle, WA (US)

(*) Notice: Subject to any disclaimer, the term of this patent is extended or adjusted under 35 U.S.C. 154(b) by 19 days.

(21) Appl. No.: 10/329,074

(22) Filed: Dec. 24, 2002

(65) Prior Publication Data

US 2004/0128096 A1 Jul. 1, 2004

(51) Int. Cl.[7] .............................................. G06F 19/00
(52) U.S. Cl. ........................... 702/96; 340/949; 701/4
(58) Field of Search ................ 702/96, 144; 73/170.02; 340/945, 949; 701/4

(56) References Cited

U.S. PATENT DOCUMENTS 3,693,872 A * 9/1972 Titus ....................... 235/78 N
6,561,020 B2 * 5/2003 Glenney ................. 73/170.02

* cited by examiner

Primary Examiner—Kamini Shah

(57) ABSTRACT

A system, method, and computer program product for analyzing flight test and FDR data that overcomes technical difficulties associated with traditional flight data analysis methods. The method includes inputting angular, linear data and recorded air data, where angular data may include Euler angles or angular rates and linear data may include altitude, ground speed, airspeed, drift angle, runway excursion or load factors. The method generates first inertial data using optimal control to minimize the objective function associated with the angular data and second inertial data using optimal control to minimize the objective function associated with the linear data. The method determines wind speed and direction based on the first and second generated inertial data and the air data.

11 Claims, 8 Drawing Sheets

SYSTEM AND METHOD FOR KINEMATIC CONSISTENCY PROCESSING

FIELD OF THE INVENTION

This invention relates generally to aircraft flight data processing and, more specifically, to a system and method for kinematically correcting flight data.

BACKGROUND OF THE INVENTION

Rigid aircraft motion while airborne is described by complex six degrees of freedom (6-DOF) dynamics. An aircraft, while in the air, is free to move in six degrees of freedom The aircraft can rotate about any of its three axes x, y and z. The corresponding rotational or angular velocities are labeled as p (roll rate), q (pitch rate) and r (yaw rate), respectively. The aircraft can also translate along any of its three axes x, y, and z. The corresponding translational or linear velocities are identified as u (forward velocity), v (side velocity) and w (up or down velocity), respectively.

Rotational and translational aircraft motion along these axes is determined by measurement or calculation based on measured data reflecting angular and linear aircraft movement. Aircraft position, speed and acceleration (or load factor) data measured from different instruments usually contain measurement errors from sensors, transducers or data acquisition systems. In order to obtain accurate aircraft flight data, a kinematic consistency process is used to remove measurement errors. Kinematics relates to the motion of a body or a system of bodies without consideration given to its mass or the forces acting on it. Kinematic consistency is a process by which aircraft dynamic data measured and recorded in a flight test or in a Flight Data Recorder (FDR) is kinematically corrected in accordance with physics laws. Kinematically corrected flight test data is essential for aerodynamic coefficient extraction and subsequent simulation model development. Kinematic checking of FDR data provides accurate aircraft motion information for accident and incident investigation.

Rotational Kinematic Consistency Analysis

Flight test and FDR data record Euler angles for bank $\phi_F$, pitch $\theta_F$ and heading $\psi_F$. This information is typically determined using an onboard aircraft computer such as in an Inertial Reference Unit (IRU). Rotational kinematic consistency procedures use these Euler angles to calculate angular accelerations pdt, qdt, rdt and angular rates p, q, r.

The rates of Euler angles are calculated by differentiating the recorded Euler angles. Aircraft angular roll p, pitch q and yaw r rates are calculated through transformation. The resulting angular rates produce spiky data due to sparse and/or noisy data initially incorporated in the Euler angles. The angular rates must be filtered to mask off the high frequency component of the data. This filtering process is based on an artificially established threshold that is subjectively determined and variable in nature. As such, in addition to limitations associated with its subjective implementation, it inherently generates errors that can cumulate when integrated for Euler angles, and can also introduce artificial oscillations not present in the original data. Angular accelerations pdt, qdt, rdt are calculated by differentiating angular roll p, pitch q and yaw r rates.

Translational Kinematic Consistency Analysis

Flight test and FDR data produce load factors measured by aircraft accelerometers. Load factor components include longitudinal acceleration (x-axis), lateral acceleration (y-axis) and normal or vertical acceleration (z-axis). Load factors are useful parameters because when integrated properly they provide information about the inertial velocity and position of the aircraft. In addition, this information may be used with airspeed information to calculate winds. However, accelerometers that measure the load factors suffer from inherent errors that must be corrected to avoid misleading results due to integrations.

Two principal accelerometer errors are (1) the error due to the accelerometer location not coinciding exactly with the center of gravity (CG), and (2) the error due to accelerometer offsets or biases. The magnitude of the error due to the accelerometer location not coinciding with the CG is typically small, but may be significant. The bias error, on the other hand, is likely very significant because even a small offset will generate large errors when integrated over time. The load factors reported by the accelerometers are rarely the actual load factors at the accelerometer location because the sensor is not calibrated perfectly. The recorded load factor at the accelerometer is often offset from the true value by a constant bias. The biases that apply to an upset event must be determined at a point prior to but as close to the upset event as possible. The biases must be accounted for because even small errors in load factor data will produce very large errors in speed and position calculations when integrated over time.

Various approaches have been developed for removing accelerometer bias error. One method of performing kinematic consistency processing is to simplify dynamics by ignoring 6-DOF coupling or, in other words, ignoring the rotational velocities p, q and r and the translational velocities u, v and w. While this approach can avoid difficulties in dealing with 6-DOF dynamics complexities, it produces kinematic correction only for trimmed level flight. For flight maneuvers such as banked turns and stalls the method fails to produce a reliable and consistent correction for the entire maneuver. For the same reason the method is also not adequate for analyzing FDR data recorded during aircraft accidents/incidents.

Under ideal circumstances, the 6-DOFs are coupled when aircraft flight data is evaluated to provide optimum results. A different method of performing kinematic consistency processing that preserves that 6-DOF dynamics is that used by the National Transportation Safety Board (NTSB) in association with the analysis of FDR data for aircraft accident/incident investigations.

In the NTSB method, accelerometer biases are calculated for the aircraft in flight through an iterative process that compares the position resulting from integration of the accelerometer data with a position calculated using recorded navigation data. First, the actual position of the aircraft is defined using groundspeed and drift angle navigation information recorded by the FDR. A better estimate of altitude is also made by solving the hydrostatic equation with estimates of the actual air density at each point. Next, an estimate of the accelerometer biases is made by computing the load factors that result from the position information just derived, and comparing these to the recorded load factors.

At this point the iteration begins. The load factors are updated with the bias estimates, and then integrated to obtain position information. These integrated positions are compared to the inertial positions calculated previously, and an error is calculated. The sensitivity of the position error to each of the accelerometer biases is calculated by changing the bias values slightly and recomputing the errors. Using these sensitivities, the biases are updated, and the positions, errors and biases are recalculated. When changes in the biases no longer result in a reduction in the errors, then the best estimate of the biases has been found and the final load factors are computed. The final integrated velocities and positions are also calculated and represent the best available estimate of the inertial speeds.

The NTSB approach relies heavily on trial-by-error iteration and the subjective efforts of data manipulators to manually remove accelerometer bias error based on experience and individual interpretation. For example, NTSB process is laborious and not repeatable with different users because each user must rely on subjective judgment to modify the bias error during the iterative process. This approach magnifies computational difficulties associated with equation couplings and integration. Moreover, because the approach relies heavily on subjective experience, the accuracy and reliability of data correction are significantly diminished. In addition, with the NTSB process, it is mathematically difficult to reconstruct time-varying load factors if less than the basic required linear data is available.

Wind Analysis

Wind is the difference between the motion of an aircraft relative to the Earth and its motion relative to the air. Determining wind speed and direction is an aspect of aircraft flight analysis that is important both for simulation model development as well as for accident and incident investigation. The accuracy of current wind analyses is suboptimal due to their reliance on the results of inferior rotational and translational kinematic consistency analyses, as described above. In addition, current wind analyses do not accurately evaluate the impact of aircraft sideslip.

Thus, there is a need for an automated kinematic consistency process that overcomes the limitations associated with current rotational and translational kinematic consistency processes and wind analyses.

SUMMARY OF THE INVENTION

A system, method, and computer program product for analyzing flight test and FDR data that overcomes technical difficulties associated with traditional flight data analysis methods. The present invention strictly follows physics laws without compromising the complexities of aircraft dynamics or relying on manual iteration or subjective user's experiences. As a result, the present invention enhances accuracy and reliability of corrected flight data, providing more accurate flight simulation model development and increased confidence of analytical results for accident/incident investigations.

The method for kinematic consistency analysis of flight data includes inputting angular, linear data and recorded air data, where angular data may include Euler angles or angular rates and linear data may include altitude, ground speed, airspeed, drift angle, runway excursion or load factors. The method generates first inertial data using optimal control to minimize the objective function associated with the angular data and second inertial data using optimal control to minimize the objective function associated with the linear data. The method determines wind speed and direction based on the first and second generated inertial data and the air data.

In an alternative embodiment, the rotational kinematic consistency method includes inputting angular data, where angular data includes Euler angles. A first rate of angular acceleration is determined. Angular rates are generated based on the first rates of angular acceleration. Euler angles are generated based on the angular rates. A second rate of angular acceleration is generated using optimal control to minimize the objective function associated with the input and integrated Euler angles.

In yet an alternative embodiment, the translational kinematic consistency method includes inputting angular data and linear data, where linear data includes load factors. A first constant bias corrections for load factors and first inertial speed is determined. An integrated inertial speed is generated based on the input angular and linear data and the determined first constant bias corrections for load factors and first inertial speed. Integrated linear data is generated. A second constant bias corrections for load factors and second inertial speed are generated using optimal control to minimize the objective function associated with the input linear data and integrated linear data.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a system and method for processing flight test and Flight Data Recorder (FDR) data to ensure that measured aircraft position, speed and acceleration (or load factors) data are kinematically consistent and compatible. In a preferred embodiment, the present invention initially performs a rotational kinematic analysis to determine the kinematically consistent angular rates and acceleration, as well as more accurate Euler angles associated with an aircraft's rotational movement. Using the results of the rotational kinematic consistency analysis, a translational kinematic consistency analysis is performed. This produces kinematically consistent load factors and inertial speed associated with the aircraft's translational movement, as well as more accurate altitude, ground speed and drift angle data. The inertial data generated from these two analyses are combined with recorded air data to calculate wind speed and direction.

Figure 1:
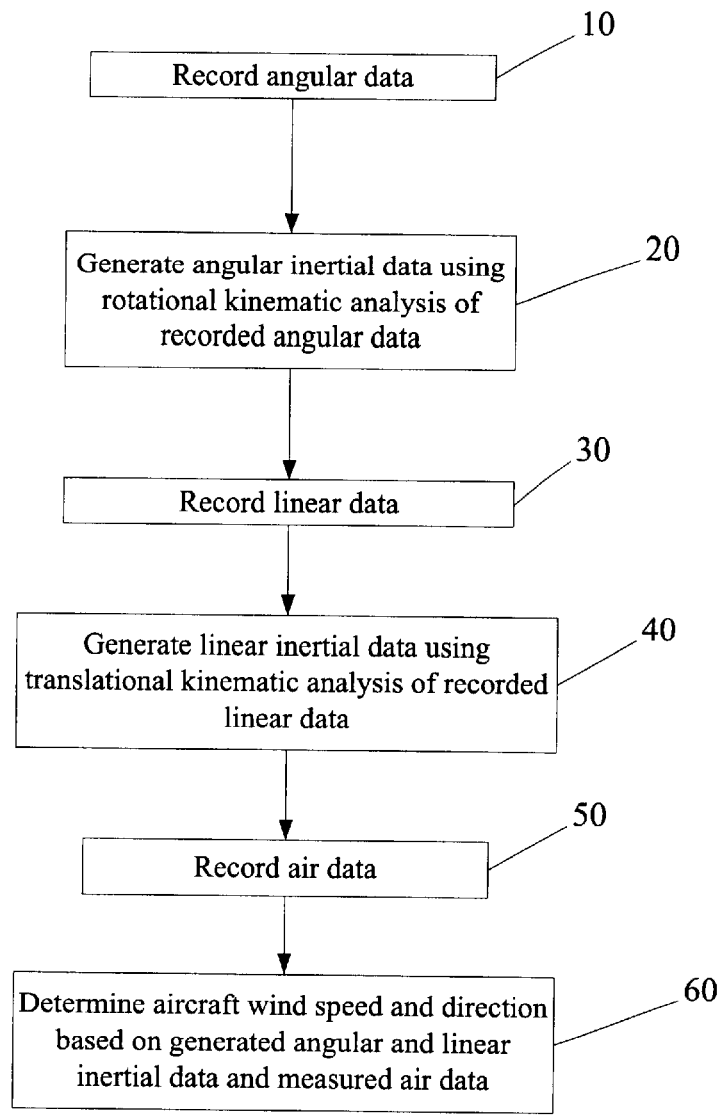
FIG. 1 is a high-level flowchart description of the preferred kinematic consistency analysis of the present invention.

An overview of the methodology of the preferred embodiment is described more specifically with reference to FIG. 1. At block 10, angular data associated with the rotational movement of a particular aircraft is determined. Angular data may include measured angular rates such as roll, pitch and yaw as well as Euler angles computed in real time by onboard computers. At block 20, angular inertial data is generated using kinematic consistency analysis of the recorded angular data to produce kinematically consistent angular rates and acceleration, as well as more accurate Euler angles associated with the aircraft's rotational movement.

At block 30, linear data associated with the translational movement of the aircraft is determined. Linear data may include measured altitude and calculated ground speed, drift angle and load factors information, which are preferably recorded as flight test or FDR data. At block 40, linear inertial data is generated using kinematic analysis of the recorded linear data to produce kinematically consistent load factors and inertial speed associated with the aircraft's translational movement.

At block 50, air data associated with the aircraft flight is recorded. Air data may include measured airspeed as well as alpha vane and beta port data. Alpha vane indicates the angle of attack, or the angle difference between the aircraft nose and the aircraft moving direction in the vertical plane (x-z plane, or plane of symmetry). Beta, also referred to as slideslip, is the angle difference between the aircraft nose and the aircraft moving direction in the lateral plane (x-y plane) Alpha vane and beta port data are preferably measured. However, beta (sideslip) may be derived from kinematically consistent data combined with aerodynamic force model. At block 60, aircraft wind speed and direction is determined based on the generated angular and linear inertial data and determined air data.

Figure 2:
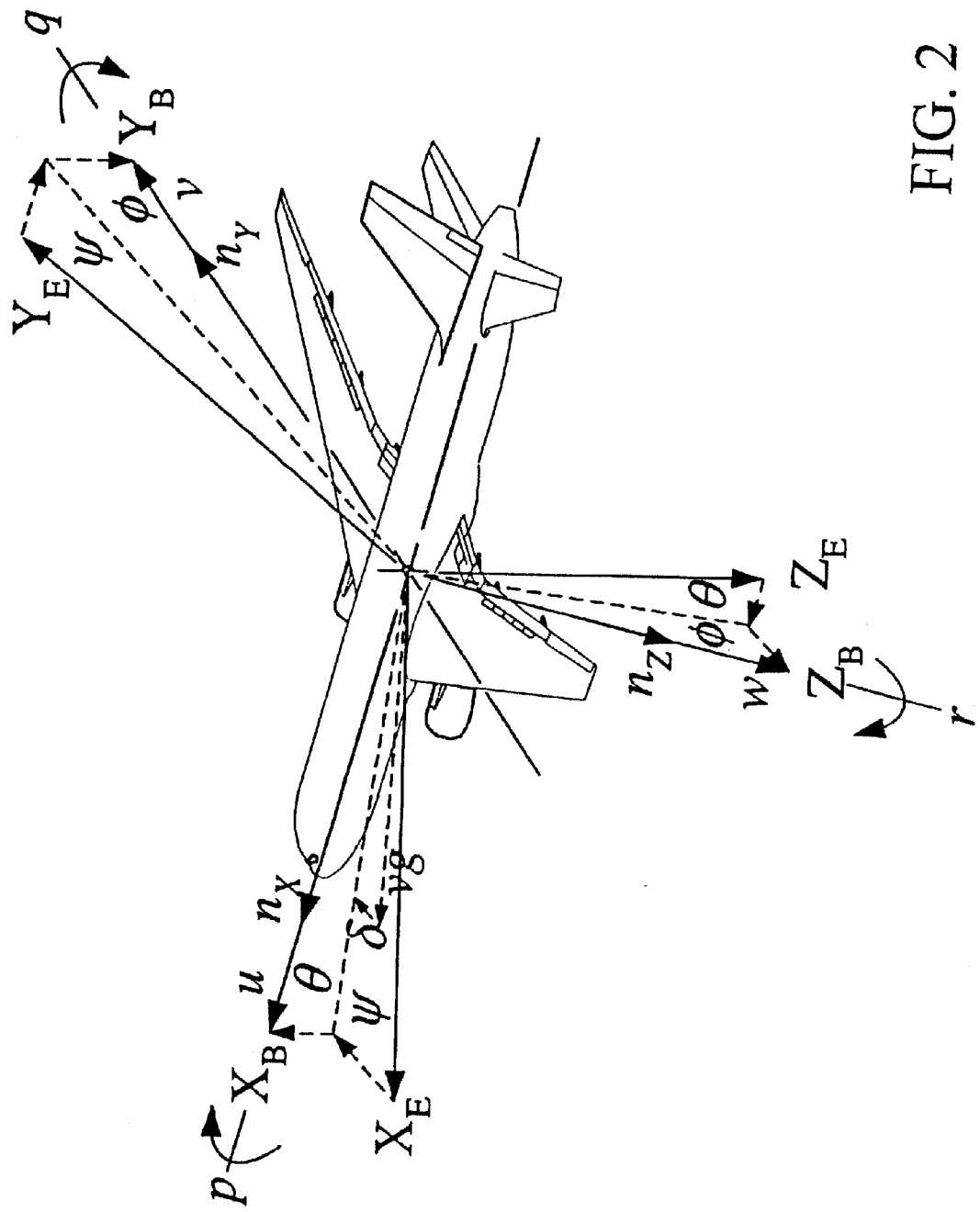
FIG. 2 is a graphical depiction of an aircraft showing the parameters involved in the preferred kinematic consistency analysis of the present invention.

The parameters involved in the automated kinematic consistency process of the present invention are described more specifically with reference to FIG. 2 utilizing the following terms:

$X_B, Y_B, Z_B$ Body Reference Frame
$X_E, Y_E, Z_E$ Body Reference Frame
$n_X, n_Y, n_Z$ Linear Acceleration Along Body Reference Frame
u, v, w Inertial Speed Components Body Reference Frame
p, q, r Angular Rates About Body Reference Frame
$\theta$ Pitch Angle
$\phi$ Bank Angle
$\psi$ Heading Angle
vg Ground Speed
$\delta$ Drift Angle The automated kinematic consistency analysis of the present invention preferably includes a rotational kinematic analysis, a translational kinematic analysis and a wind analysis. The system and methodology of each of these analyses is independent. While it is preferable to use the present invention to perform the rotational and translational kinematic analyses and wind speed analysis, it is not necessary to benefit from the separate aspects of the invention. For example, angular rates and accelerations determined using traditional rotational kinematic analysis may be used when performing the translational kinematic analysis of the present invention. Likewise, kinematically consistent angular rates and accelerations and Euler angles may be determined using the rotational kinematic analysis of the present invention without performing the translational kinematic analysis of the present invention. Finally, the rotational and translational kinematic analyses of the present invention may be performed without performing a wind analysis.

Rotational Kinematic Consistency Analysis

In a preferred embodiment, the present invention initially performs a rotational kinematic analysis to determine angular accelerations pdt, qdt, rdt to match measured aircraft angular roll $p_F$, pitch $q_F$ and yaw $r_F$ rates and the constant bias $\Delta p$, $\Delta q$, $\Delta r$ to match calculated Euler angles for bank $\phi_F$, pitch $\theta_F$ and heading $\psi_F$. This is accomplished by minimizing the objection function $$J = \int_0^{t_f} \left\{ \begin{array}{l} \left(\frac{\phi_F - \phi}{\Delta_\phi}\right)^2 + \left(\frac{\theta_F - \theta}{\Delta_\theta}\right)^2 + \left(\frac{\psi_F - \psi}{\Delta_\psi}\right)^2 + \\ \left(\frac{(p_F + \Delta p) - p}{\Delta_p}\right)^2 + \left(\frac{(q_F + \Delta q) - q}{\Delta_q}\right)^2 + \\ \left(\frac{(r_F + \Delta r) - r}{\Delta_r}\right)^2 + \left(\frac{pdt}{\Delta_{pdt}}\right)^2 + \left(\frac{qdt}{\Delta_{qdt}}\right)^2 + \left(\frac{rdt}{\Delta_{rdt}}\right)^2 \end{array} \right\} dt \quad \text{Equation 1}$$

subject to dynamic equations $$\dot\phi = p + \frac{(\sin\phi q + \cos\phi r)\sin\theta}{\cos\theta}$$

$$\dot\theta = \cos\phi q - \sin\phi r$$

$$\dot\psi = \frac{\sin\phi q + \cos\phi r}{\cos\theta} \quad \text{Equation 2}$$

$$\dot p = pdt$$

$$\dot q = qdt$$

$$\dot r = rdt \quad \text{Equation 3}$$

where $\phi$ bank angle
$\theta$ pitch angle
$\psi$ heading angle
p, q, r roll, pitch and yaw rates
pdt, qdt, rdt roll, pitch and yaw accelerations This rotational kinematic consistency analysis produces kinematically consistent angular rates including roll p, pitch q and yaw r; kinematically consistent angular accelerations pdt, qdt, rdt; and corrected Euler angles for bank $\phi$, pitch $\theta$ and heading $\psi$. The resulting Euler angles are superior to recorded Euler angles because the underlying data has been smoothed to eliminate noise caused by the sparse angular data originally measured during aircraft flight.

The precise implementation of the present invention varies according to the rotational data determined and the intended application. Typically for both flight test applications and FDR situations laser gyros are present to measure angular rates including roll $p_F$, pitch $q_F$ and yaw $r_F$. An onboard computer, such as in an IRU, is used to compute Euler angles for bank $\phi_F$, pitch $\theta_F$ and heading $\psi_F$. The methodology used for determining resultant angular accelerations depends on the angular data available for review.

In flight test applications, angular rates as well as Euler angles are recorded and available for use in the rotational kinematic consistency analysis. In an embodiment of the present invention implemented for this situation, angular rate biases are determined to match Euler angles by minimizing $$J = \int_0^f \left\{ \left(\frac{\phi_F - \phi}{\Delta_\phi}\right)^2 + \left(\frac{\theta_F - \theta}{\Delta_\theta}\right)^2 + \left(\frac{\psi_F - \psi}{\Delta_\psi}\right)^2 \right\} dt \quad \text{Equation 4}$$

and angular acceleration to match corresponding angular rates is determined by minimizing $$J = \int_0^f \left\{ \left(\frac{(p_F - p_1)}{\Delta_p}\right)^2 + \left(\frac{\dot{p}dt}{\Delta_{\dot{p}dt}}\right)^2 \right\} dt \quad \text{Equation 5}$$

$$J = \int_0^f \left\{ \left(\frac{(q_F - q_1)}{\Delta_q}\right)^2 + \left(\frac{\dot{q}dt}{\Delta_{\dot{q}dt}}\right)^2 \right\} dt$$

$$J = \int_0^f \left\{ \left(\frac{(r_F - r_1)}{\Delta_r}\right)^2 + \left(\frac{\dot{r}dt}{\Delta_{\dot{r}dt}}\right)^2 \right\} dt$$

This methodology provides more accurate angular accelerations by matching angular rates directly.

Figure 3A:
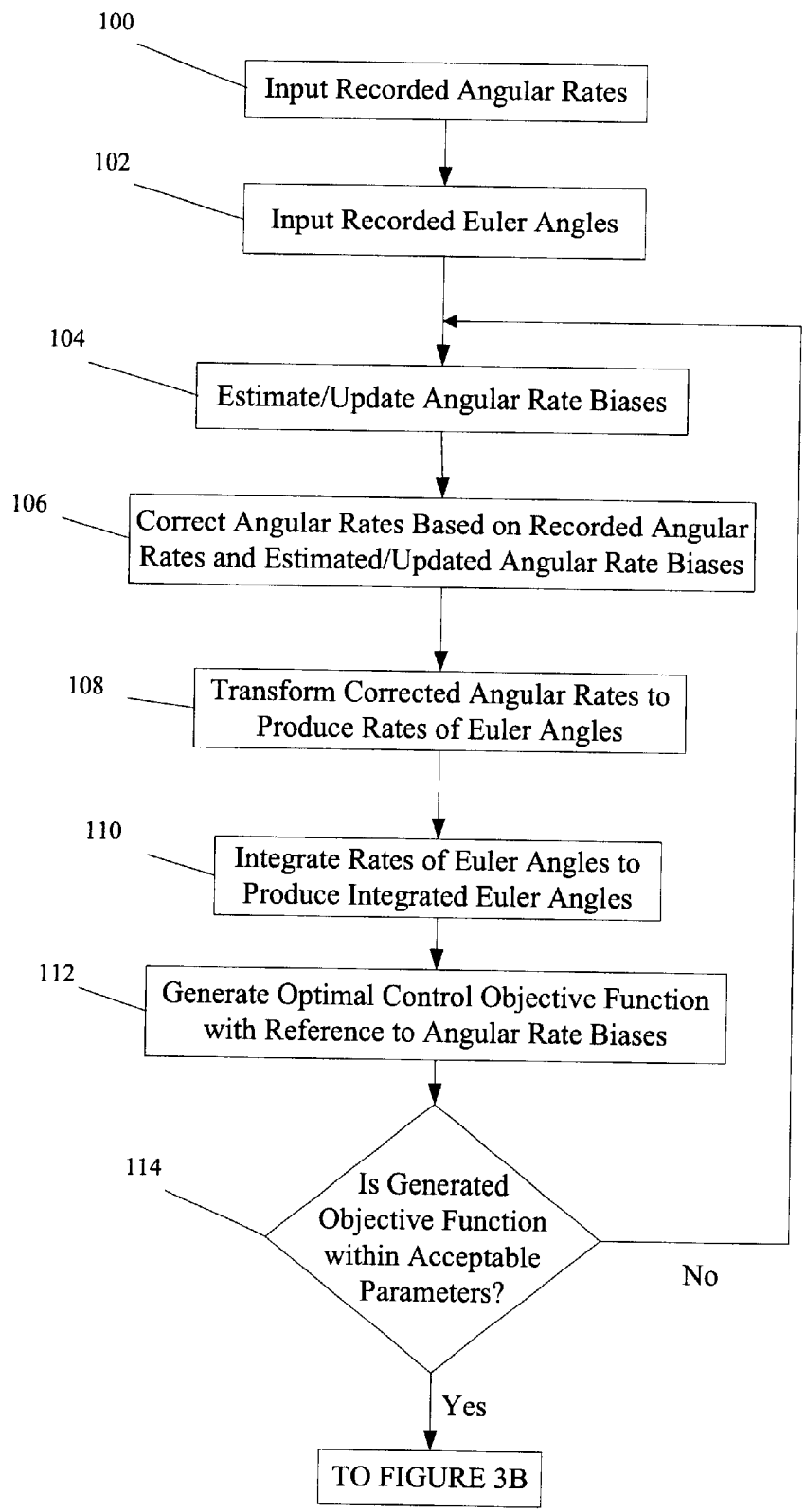
FIGS. 3A and 3B illustrate a flowchart of a preferred embodiment of the rotational kinematic consistency analysis of the present invention as applied to flight test data.

The methodology of this embodiment of the present invention is further described with reference to FIGS. 3A and 3B. With reference initially to FIG. 3A, at box 100, angular rates associated with the flight of a particular aircraft are input. Angular rates include roll $p_F$, pitch $q_F$ and yaw $r_F$. At block 102, Euler angles for bank $\phi_F$, pitch $\theta_F$ and heading $\psi_F$ are input into the system. These are computed in the IRUs in real time by integrating the rates of Euler angles derived from the recorded angular rates.

At block 104, angular rate biases $\Delta p$, $\Delta q$, $\Delta r$ are estimated. In the preferred embodiment, these biases are initially assumed to be zero. At block 106, corrected angular rates p, q, r are calculated based on the measured angular rates for roll $p_F$, pitch $q_F$ and yaw $r_F$ and the estimated angular rate biases $\Delta n$, $\Delta q$, $\Delta r$ using the following $p=p_F+\Delta p$ $q=q_F+\Delta q$ $r=r_F+\Delta r$      Equation 6

Given that angular rate biases $\Delta p$, $\Delta q$, $\Delta r$ are initially assumed to be zero, p, q and r are equal to $p_F$, $q_F$ and $r_F$ in the first iteration.

At block 108, the corrected angular rates are used along with the calculated Euler angles according to Equation 2 to produce the rates of Euler angles $\dot\phi$, $\dot\theta$, $\dot\psi$. At block 110, the rates of Euler angles $\dot\phi$, $\dot\theta$, $\dot\psi$ are integrated to produce integrated Euler angles for bank $\phi$, pitch $\theta$ and heading $\psi$.

At block 112, an optimal control process is used to minimize the objective function of Equation 4. Optimal control is a process of generating control input and/or parameters to drive a dynamic system to a time history target. In this case, the objective function is minimized with respect to angular rate biases $\Delta p$, $\Delta q$, $\Delta r$, which are imbedded in Euler angles for bank $\phi$, pitch $\theta$ and heading $\psi$. The optimal control process involves comparing integrated Euler angles $\phi$, $\theta$, $\psi$ with calculated Euler angles $\phi_F$, $\theta_F$, $\psi_F$.

At decision block 114, the resulting gradient of objective function J with respect to angular rate biases $\Delta p$, $\Delta q$, $\Delta r$ is evaluated to determine whether it is within acceptable parameters. In the preferred embodiment, the goal is to reduce the gradient of objective function J to as close to zero as possible given the imperfections inherent in the data. If the resulting gradient of objective function J is within predetermined tolerances, the logic proceeds to block 116 of FIG. 3B. If the resulting gradient of objection function J is not within predetermined tolerances, the logic returns to block 104, where angular rate biases $\Delta p$, $\Delta q$, $\Delta r$ are reestimated, preferably with reference to the determined gradient of objective function J, and the iterative process repeats itself as described above.

Figure 3B:
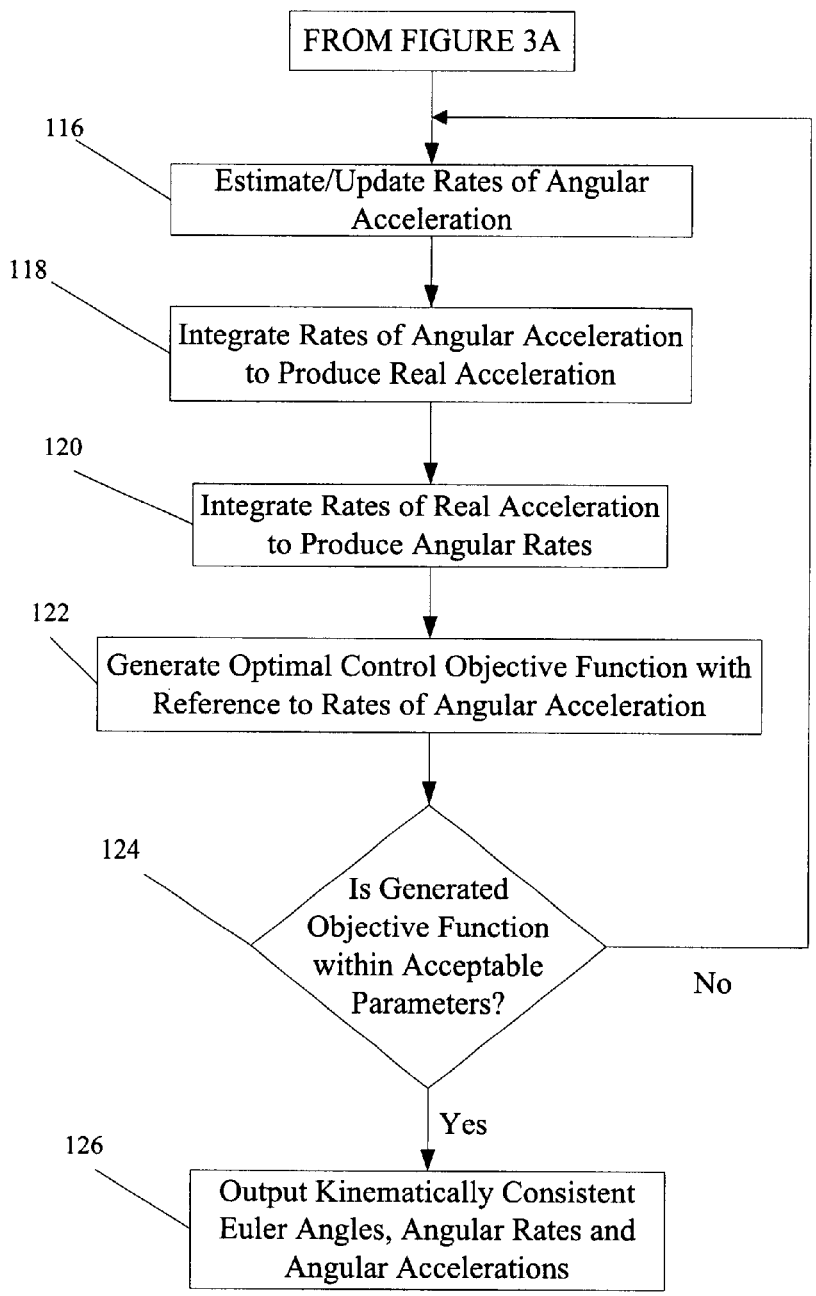

With reference to FIG. 3B, at block 116, rates of angular acceleration $\dot{p}dt$, $\dot{q}dt$, $\dot{r}dt$ are estimated In the preferred embodiment, these rates are initially assumed to be zero. At block 118, the rates of angular acceleration $\dot{p}dt$, $\dot{q}dt$, $\dot{r}dt$ are integrated to produce angular accelerations pdt, qdt, rdt. At block 120, angular accelerations pdt, qdt, rdt are integrated a second time to produce integrated angular rates $p_I$, $q_I$, $r_I$.

At block 122, an optimal control process is used to minimize the three objective functions of Equation 5 with respect to the rates of angular acceleration $\dot{p}dt$, $\dot{q}dt$, $\dot{r}dt$. The optimal control process involves comparing integrated angular rates $p_I$, $q_I$, $r_I$ with measured angular rates $p_F$, $q_F$, $r_F$.

At decision block 124, the resulting gradient of objective functions J with respect to the rates of angular acceleration $\dot{p}dt$, $\dot{q}dt$, $\dot{r}dt$ along time history is evaluated to determine whether it is within acceptable parameters. In the preferred embodiment, the goal is to reduce the gradient of objection functions J to as close to zero as possible given the imperfections inherent in the data input. If the resulting gradient of objective functions J is within predetermined tolerances, the logic proceeds to block 126. If the resulting gradient of objection functions J is not within predetermined tolerances, the logic returns to block 116, where rates of angular acceleration $\dot{p}dt$, $\dot{q}dt$, $\dot{r}dt$ are reestimated, preferably with reference to the determined gradient of objective functions J, and the iterative process repeats itself as described above.

At block 126, the process outputs kinematically consistent Euler angles $\phi$, $\theta$, $\psi$, corrected angular rates $p_C$, $q_C$, $r_C$ and angular accelerations pdt, qdt, rdt. The Euler angles $\phi$, $\theta$, $\psi$ output are preferably the integrated Euler angles determined during the last iteration at block 110. The kinematically consistent angular rates $p_C$, $q_C$, $r_C$ output are preferably determined according to the following $p_C=p_I+\Delta p$ $q_C=q_I+\Delta q$ $r_C=r_I+\Delta r$      Equation 7

The angular accelerations pdt, qdt, rdt are preferably the integrated angular accelerations determined during the last iteration at block 118.

The precise ordering of the steps described above with respect to FIGS. 3A and 3B may vary without departing from the scope of the present invention. For example, the step of inputting measured angular rates (block 100) need not occur until immediately prior to the correction of angular rates based on measured angular rates and estimated angular rate biases (block 106). In yet another example, Euler angles, computed onboard the aircraft, need not be input (block 102) until immediately prior to the generation of the objective function with reference to angular rate biases (block 112). In other words, the ordering of the above-mentioned process is constrained only by the timing of necessary inputs to effectuate formulaic determinations.

The preferred operation changes when the application involves FDR data. Measured angular rates are usually not recorded and available for use in the rotational kinematic consistency analysis; only Euler angles are recorded and available. In an embodiment of the present invention implemented for this situation, time-varying angular accelerations to match Euler angles are determined by minimizing $$J = \int_0^{t_f} \left\{ \left(\frac{\phi_F - \phi}{\Delta_\phi}\right)^2 + \left(\frac{\theta_F - \theta}{\Delta_\theta}\right)^2 + \left(\frac{\psi_F - \psi}{\Delta_\psi}\right)^2 + \left(\frac{\dot{p}dt}{\Delta_{\dot{p}dt}}\right)^2 + \left(\frac{\dot{q}dt}{\Delta_{\dot{q}dt}}\right)^2 + \left(\frac{\dot{r}dt}{\Delta_{\dot{r}dt}}\right)^2 \right\} dt \quad \text{Equation 8}$$

Figure 4:
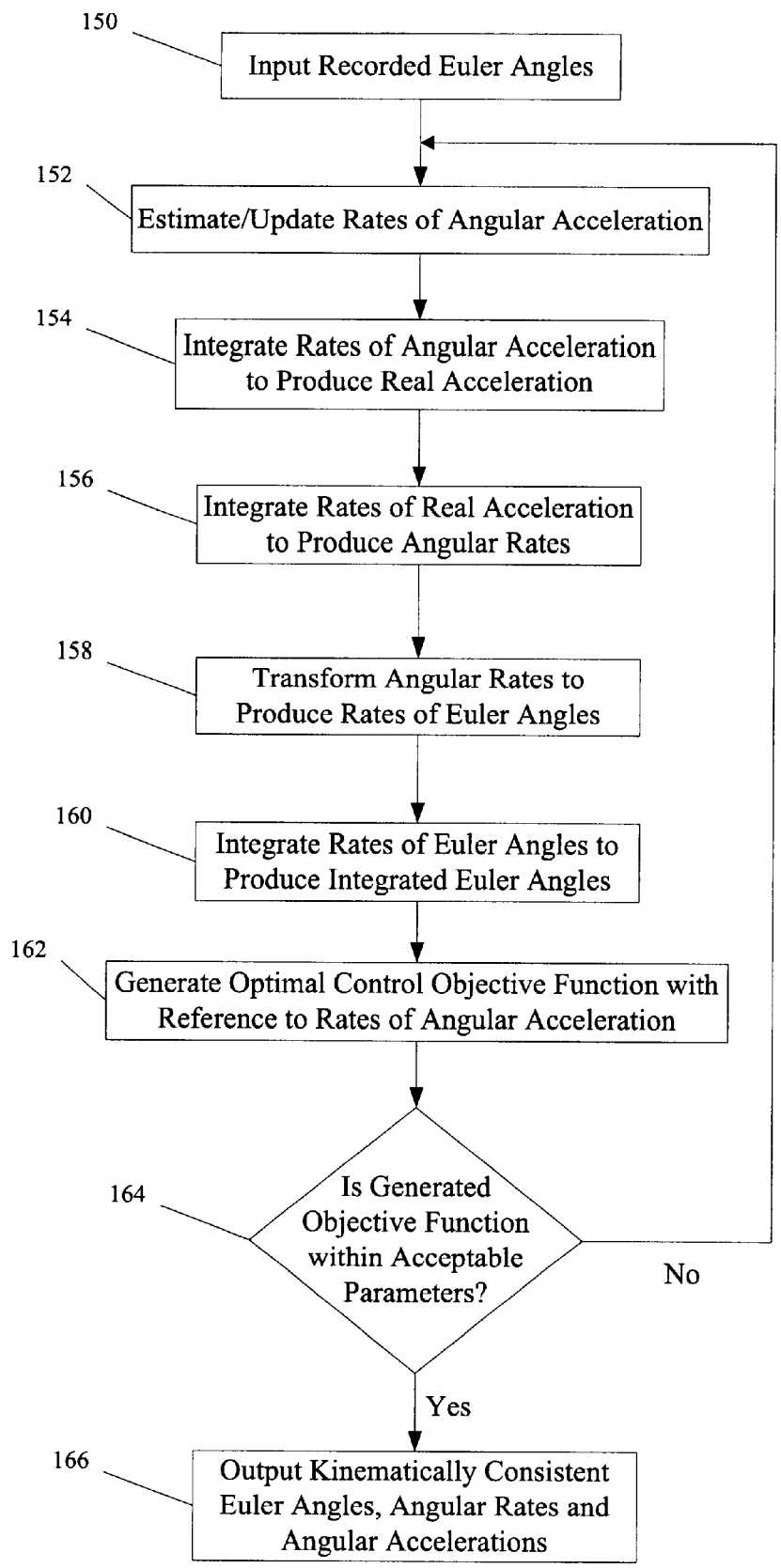
FIG. 4 illustrates a flowchart of a preferred embodiment of the rotational kinematic consistency analysis of the present invention as applied to FDR data.

The methodology of this embodiment of the present invention is further described with reference to FIG. 4. At block 150, Euler angles for bank $\phi_F$, pitch $\theta_F$ and heading $\psi_F$ are input into the system. These are computed in the IRUs in real time by integrating the rates of Euler angles derived from the measured angular rates.

At block 152, rates of angular acceleration $\dot{p}dt$, $\dot{q}dt$, $\dot{r}dt$ are estimated. In the preferred embodiment, these rates are initially assumed to be zero. At block 154, the rates of angular acceleration $\dot{p}dt$, $\dot{q}dt$, $\dot{r}dt$ are integrated to produce angular accelerations pdt, qdt, rdt. At block 156, angular accelerations pdt, qdt, rdt are integrated a second time to produce integrated angular rates p, q, r.

At block 158, the integrated angular rates are used along with the integrated Euler angles according to Equation 2 to produce the rates of Euler angles $\dot{\phi}$, $\dot{\theta}$, $\dot{\psi}$. At block 160, the rates of Euler angles $\dot{\phi}$, $\dot{\theta}$, $\dot{\psi}$, are integrated to produce integrated Euler angles for bank $\phi$, pitch $\theta$ and heading $\psi$.

At block 162, an optimal control process is used to minimize the objective function of Equation 8 with respect to the rates of angular acceleration $\dot{p}dt$, $\dot{q}dt$, $\dot{r}dt$. The optimal control process involves comparing integrated Euler angles $\phi$, $\theta$, $\psi$ with recorded Euler angles $\phi_F$, $\theta_F$, $\psi_F$.

At decision block 164, the resulting gradient of objective function J with respect to the rates of angular acceleration $\dot{p}dt$, $\dot{q}dt$, $\dot{r}dt$ along time history is evaluated to determine whether it is within acceptable parameters. In the preferred embodiment, the goal is to reduce the gradient of objection function J to as close to zero as possible given the imperfections inherent in the data input. If the resulting gradient of objective function J is within predetermined tolerances, the logic proceeds to block 166. If the resulting gradient of objection function J is not within predetermined tolerances, the logic returns to block 152, where rates of angular acceleration $\dot{p}dt$, $\dot{q}dt$, $\dot{r}dt$ are reestimated, preferably with reference to the determined gradient of objective function J, and the iterative process repeats itself as described above.

At block 166, the process outputs kinematically consistent Euler angles $\phi$, $\theta$, $\psi$, corrected angular rates p, q, r and angular accelerations pdt, qdt, rdt. The Euler angles $\phi$, $\theta$, $\psi$ output are preferably the integrated Euler angles determined during the last iteration at block 160. The kinematically consistent angular rates p, q, r output are preferably the integrated angular rates p, q, r determined during the last iteration at block 156. The angular accelerations pdt, qdt, rdt are preferably the integrated angular accelerations determined during the last iteration at block 154.

The precise ordering of the steps described above with respect to FIG. 4 may vary. For example, recorded Euler angles need not be input (block 150) until immediately prior to the generation of the objective function with reference to the rates of angular acceleration $\dot{p}dt$, $\dot{q}dt$, $\dot{r}dt$ (block 162). In other words, the ordering of the above-mentioned process is constrained only by the timing of necessary inputs to effectuate formulaic determinations.

The present invention provides further optional implementations depending on the rotational data available and the intended application. In an alternative embodiment, the aircraft under evaluation operates only in level flight, producing trim conditions having no rotational motion. In this situation, no rotational kinematic consistency analysis is performed. For a subsequent translational kinematic analysis, angular rates and angular accelerations are assumed to be zero. In yet an alternative embodiment, only translational kinematic consistency analysis is needed. In this situation, no rotational kinematic consistency analysis is performed, and the translational kinematic consistency analysis is performed using user-supplied angular rates and accelerations.

Translational Kinematic Consistency Analysis

In a preferred embodiment, the present invention performs a translational kinematic analysis to determine load factors corrections including longitudinal acceleration (x-axis ($\Delta n_X$)), lateral acceleration (y-axis ($\Delta n_Y$)) and normal acceleration (z-axis ($\Delta n_Z$)) in constant bias or time-varying adjustment to match recorded altitude $h_F$, ground speed $vg_F$ and drift angle $\delta_F$. In addition to correcting load factors, the present invention provides kinematically consistent altitude h, ground speed vg, drift angle $\delta$, and inertial speed u, v, w data. The present invention is accomplished by minimizing the objection function $$J = \int_{t_0}^{t_f} \left\{ \left(\frac{h_F - h}{\Delta_h}\right)^2 + \left(\frac{vg_F - vg}{\Delta_v}\right)^2 + \left(\frac{\delta_F - \delta}{\Delta_\delta}\right)^2 + \left(\frac{\Delta \dot{n}_x}{\Delta_{nxdt}}\right)^2 + \left(\frac{\Delta \dot{n}_y}{\Delta_{yxdt}}\right)^2 + \left(\frac{\Delta \dot{n}_z}{\Delta_{zxdt}}\right)^2 \right\} dt \quad \text{Equation 9}$$

where ground speed vg is computed as $$vg = \sqrt{(u^2 + v^2 + w^2) - \dot{h}^2} \quad \text{Equation 10}$$

drift angle $\delta$ is computed by $$\delta = \tan^{-1} \frac{\sin\phi w - \cos\phi v}{\cos\theta u + \sin\phi\sin\theta v + \cos\phi\sin\theta w} \quad \text{Equation 11}$$

and translational dynamics is described by $$\dot{u} = rv - qw + g(-\sin\theta + n_X + \Delta n_X)$$
$$\dot{v} = pw - ru + g(\cos\theta\sin\phi + n_Y + \Delta n_Y)$$
$$\dot{w} = qu - pv + g(\cos\theta\cos\phi + n_Z + \Delta n_Z) \quad \text{Equation 12}$$
$$\dot{h} = \sin\theta\, u - \sin\phi\cos\theta\, v - \cos\phi\cos\theta\, w \quad \text{Equation 13}$$

where
  h altitude
  u x-axis speed component
  v y-axis speed component
  w z-axis speed component
  $n_X$ recorded longitudinal acceleration or load factor (x-axis)
  $n_Y$ recorded lateral acceleration or load factor (y-axis)
  $n_Z$ recorded normal acceleration or load factor (z-axis)

Equation 12 describing translational dynamics may be modified to incorporate angular accelerations pdt, qdt, rdt to correct for an accelerometer location other than at the center of gravity (CG) as follows:

$$\dot{u} = rv - qw + g(-\sin\theta + n_X + \Delta n_{XL} + \Delta n_X)$$
$$\dot{v} = pw - ru + g(\cos\theta\sin\phi + n_Y + \Delta n_{YL} + \Delta n_Y)$$
$$\dot{w} = qu - pv + g(\cos\theta\cos\phi + n_Z + \Delta n_{ZL} + \Delta n_Z) \quad \text{Equation 14}$$

In this embodiment, acceleration corrections $\Delta An_{XL}$, $\Delta n_{YL}$, $\Delta n_{ZL}$ from the accelerometer to the aircraft CG are described by $$\Delta n_{XL} = x_{acc}(q^2+r^2) + y_{acc}(rdt-p \cdot q) - z_{acc}(qdt+p \cdot r)$$

$$\Delta n_{YL} = -x_{acc}(rdt+p \cdot q) + y_{acc}(p^2+r^2) + z_{acc}(pdt-q \cdot r)$$

$$\Delta n_{ZL} = x_{acc}(qdt-p \cdot r) - y_{acc}(pdt+q \cdot r) + z_{acc}(p^2+q^2) \quad \text{Equation 15}$$

where $\Delta n_{XL}$, $\Delta n_{YL}$, $\Delta n_{ZL}$ acceleration corrections $\Delta x_{acc}$, $y_{acc}$, $z_{acc}$ x, y, z distance of the accelerometer to the aircraft CG This translational kinematic consistency analysis produces kinematically consistent load factors corrections including longitudinal acceleration (x-axis ($\Delta n_X$)), lateral acceleration (y-axis ($\Delta n_Y$)) and normal acceleration (z-axis ($\Delta n_Z$)) along with kinematically consistent inertial speed information (x-axis speed component—forward velocity u; y-axis speed component—side velocity v; z-axis speed component—up or down velocity w). It also produces kinematically consistent altitude, ground speed and drift angle.

The precise implementation of the present invention varies according to the translational data determined and the intended application. In a preferred system, a static pressure port measures the altitude $h_F$ of the aircraft. An onboard computer, such as in an Inertial Reference Unit (IRU), is used to compute: ground speed $vg_F$ and drift angle $\delta_F$. In addition, an onboard sensor, such as an accelerometer, is present to measure load factors including longitudinal acceleration (x-axis $n_X$), lateral acceleration (y-axis $n_Y$) and normal acceleration (z-axis $n_Z$).

In an optimal situation with respect to flight test applications and FDR data, altitude, ground speed, drift angle and all three load factors information are present. In this situation, the constant bias for all load factors correction with Equation 9 is simplified to $$J = \int_{t_0}^{t_f} \left\{ \left( \frac{h_F - h}{\Delta_h} \right)^2 + \left( \frac{vg_F - vg}{\Delta_v} \right)^2 + \left( \frac{\delta_F - \delta}{\Delta_\delta} \right)^2 \right\} dt \quad \text{Equation 16}$$

The present invention anticipates and provides for suboptimal situations, such as when ground speed, drift angle or load factors information is not available.

For example, if the recorded ground speed is not available but airspeed is available, Equation 9 (as simplified in Equation 16) may be used, but $vg_F$ becomes the true airspeed (TAS) derived from recorded calibrated airspeed (CAS), and vg becomes the true airspeed ($u_a$, $v_a$, $w_a$) computed from the integrated inertial speed (u, v, w) and user-supplied wind speed ($u_w$, $v_w$, $w_w$) according to the following:

$$u_a = u - u_w, \quad \text{Equation 17}$$
$$v_a = v - v_w$$
$$w_a = w - w_w$$
$$vg = \sqrt{u_a^2 + v_a^2 + w_a^2}$$

Figure 5A:
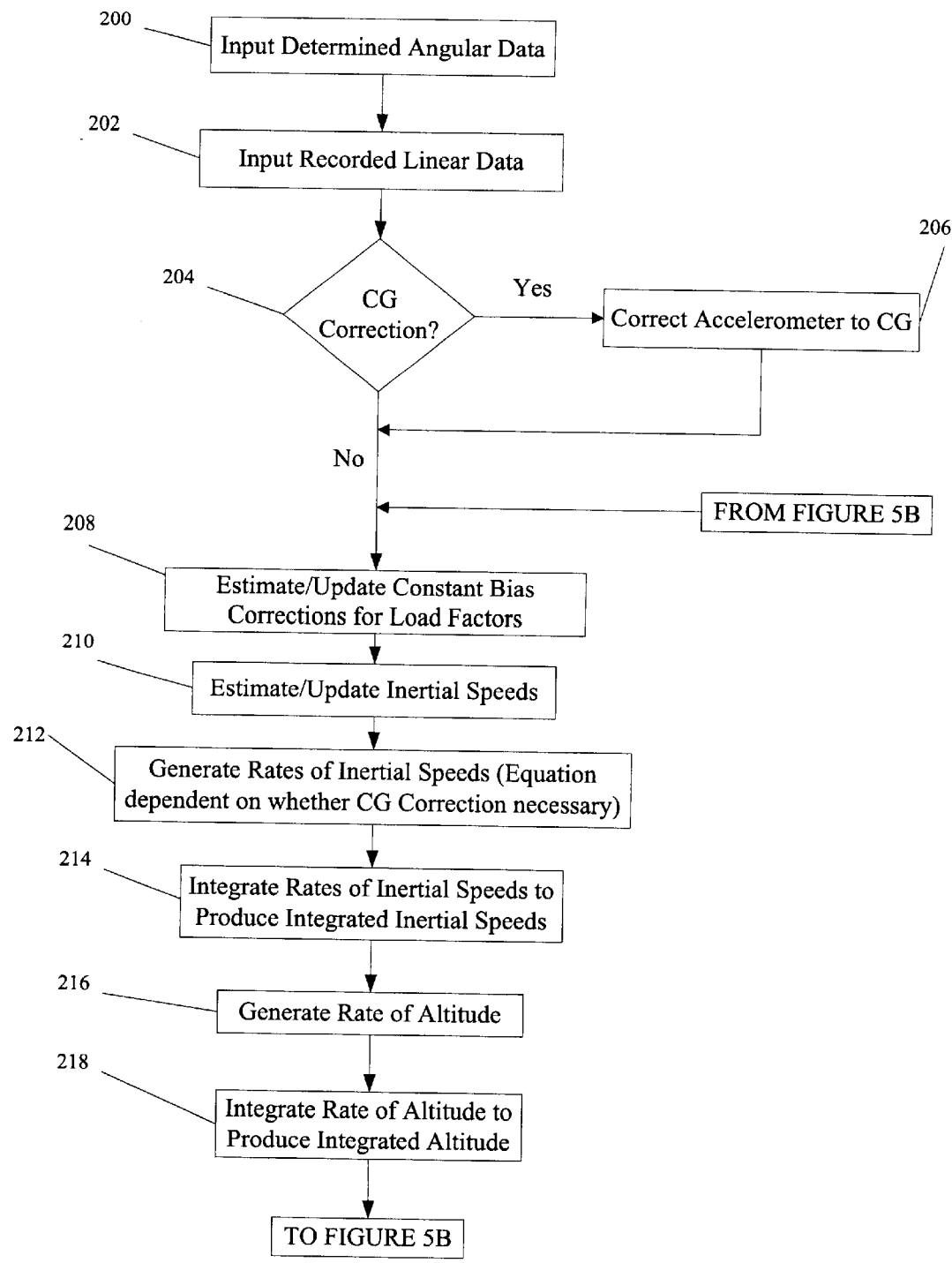
FIGS. 5A and 5B illustrate a flowchart of a preferred embodiment of the translational kinematic consistency analysis of the present invention.

In another example, if the recorded drift angle is not available but the airplane lateral excursion from runway centerline can be estimated from the recorded flight data, Equation 9 (as simplified in Equation 16) may be used, but $\delta_F$ becomes the estimated runway excursion and $\delta$ becomes the integrated runway excursion by $$s\dot{x} = \cos\psi\cos\theta u + (\cos\psi\sin\theta\sin\phi - \sin\psi\cos\phi)v + (\cos\psi\sin\theta\cos\phi + \sin\psi\sin\phi)w$$

$$s\dot{y} = \sin\psi\cos\theta u + (\sin\psi\sin\theta\sin\phi + \cos\psi\cos\phi)v + (\sin\psi\sin\theta\cos\phi - \cos\psi\sin\phi)w$$

$$\dot{\delta} = \cos\psi_{rw} s\dot{y} - \sin\psi_{rw} s\dot{x} \quad \text{Equation 18}$$

where sx, sy north distance and east distance, respectively $\psi_{rw}$ direction of the runway centerline relative to north The methodology of this embodiment of the present invention is further described with reference to FIGS. 5A and 5B. At block 200, kinematically consistent Euler angles $\phi$, $\theta$, $\psi$ and angular rates p, q, r are input into the system. This information is preferably determined by the rotational kinematic consistency process of the present invention, but may be obtained from any source or process. Obviously, the more accurate and representative the data input into the translational kinematic consistency process, the superior the resulting data. At block 202, recorded linear data, preferably including altitude $h_F$, ground speed or airspeed $vg_F$ and drift angle or runway excursion $\delta_F$ from an onboard static pressure port and IRU, is input. In addition, load factors, preferably including longitudinal acceleration (x-axis $n_X$), lateral acceleration (y-axis $n_Y$) and normal acceleration (z-axis $n_Z$), are input. This information is preferably data recorded during a flight test or by a FDR. Some or all of the information described with reference to blocks 200 and 202 may be input into the system at a different times during the described process.

At decision block 204, a determination is made whether it is necessary to correct for an accelerometer location other than at the center of gravity (CG). This step will typically be necessary, as the accelerometer in most commercial aircraft is not located at the CG. If accelerometer location correction is necessary, the logic proceeds to block 206. If accelerometer location correction is unnecessary, the logic proceeds directly to block 208.

At block 206, an acceleration location correction is calculated according to Equation 15. This step involves first inputting angular accelerations pdt, qdt, rdt and angular rates p, q, r associated with the aircraft flight. This information is preferably determined by the rotational kinematic consistency process of the present invention, but may be obtained from any source or process. The x, y, z distance between the accelerometer and the aircraft CG ($x_{acc}$, $y_{acc}$, $z_{acc}$) is also input as part of this step. The result of Equation 15 is to produce acceleration location corrections $\Delta n_{XL}$, $\Delta n_{YL}$, $\Delta n_{ZL}$ which are subsequently used in Equation 14, as described below. The logic of block 206 proceeds to block 208.

At block 208, the constant bias corrections for load factors $\Delta n_X$, $\Delta n_Y$, $\Delta n_Z$ are estimated. In the preferred embodiment, these rates are initially assumed to be zero. At block 210, inertial speed information u, v, w are estimated. The steps in blocks 208 and 210 are preferably performed simultaneously. In the preferred embodiment, inertial speed information u at $t=t_0$ is estimated to be the same as recorded ground speed or airspeed $vg_F$. Inertial speed information v, w are preferable assumed to be zero. In subsequent iterations this information is preferably updated based on the results of the prior iterative steps.

At block 212, the rates of inertial speeds $\dot{u}$, $\dot{v}$, $\dot{w}$ are generated. The equation used to determine rates of inertial speeds depends on whether an accelerometer location correction is applied. If no acceleration location correction is applied, inertial speeds $\dot{u}$, $\dot{v}$, $\dot{w}$ are preferably generated according to Equation 12. If accelerometer location correction is applied, inertial speeds $\dot{u}$, $\dot{v}$, $\dot{w}$ are preferably generated according to Equation 14. At block 214, the rates of inertial speeds $\dot{u}$, $\dot{v}$, $\dot{w}$ are integrated to produce integrated inertial speeds u, v, w.

At block 216, the rate of altitude $\dot{h}$ is generated, preferably according to Equation 13. At block 218, the rate of altitude $\dot{h}$ is integrated to produce integrated altitude h.

Figure 5B:
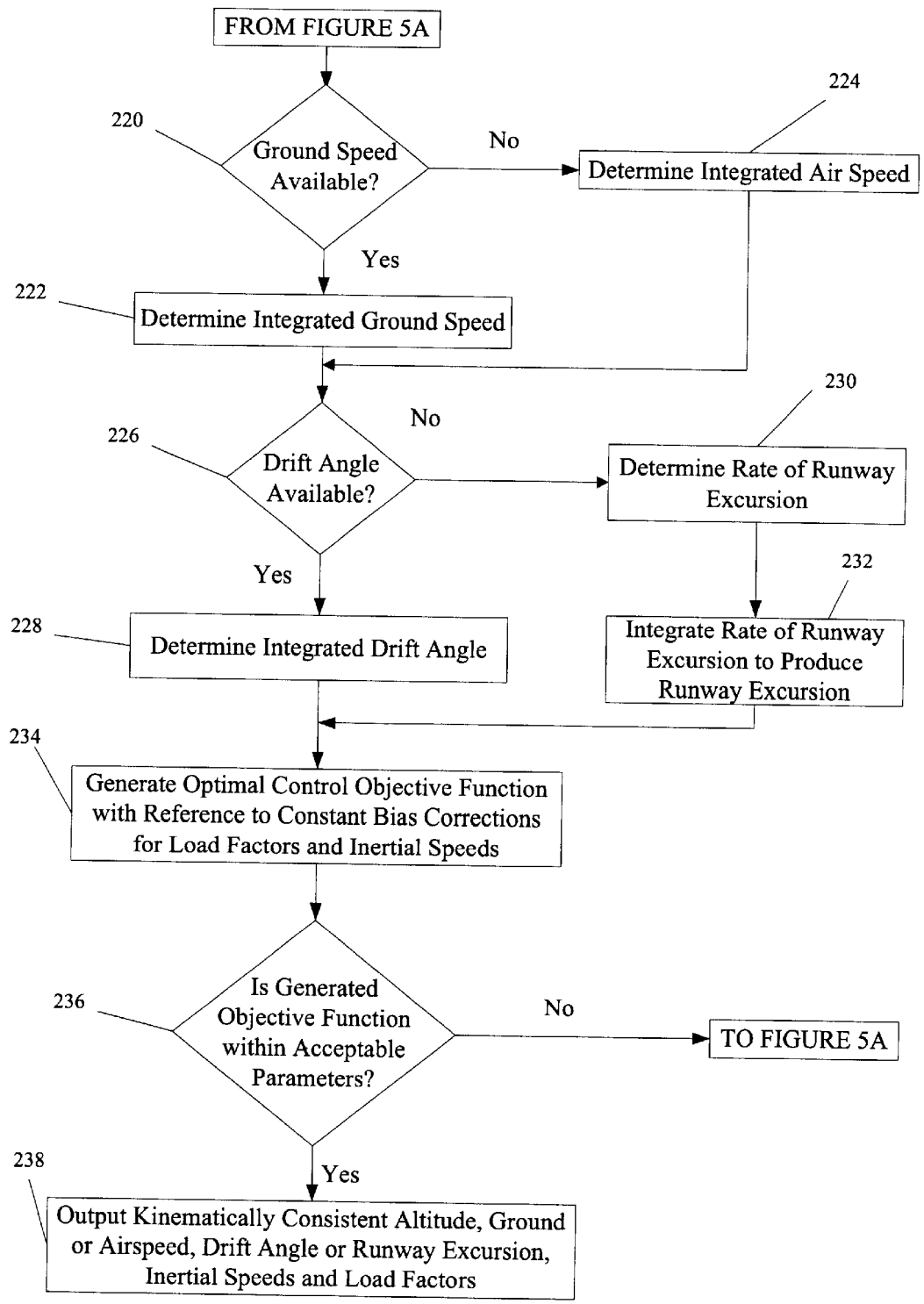

At decision block 220, described further with reference to FIG. 5B, a determination is made whether recorded ground speed or air speed information $vg_F$ is available. If recorded ground speed information, the logic proceeds to block 222, where integrated ground speed vg is preferably determined according to Equation 10, preferably using estimated inertial speed information u, v, w and the integrated altitude h generated at block 218. If recorded ground speed information is not available, but air speed information is available (as may be the case with recording data found on older aircraft), the logic proceeds to block 224. At block 224, integrated air speed vg is preferably determined using true airspeed ($u_a$, $v_a$, $w_a$) computed from the integrated inertial speed (u, v, w) and user-supplied wind speed ($u_w$, $v_w$, $w_w$) according to Equation 17. The logic of either block 222 or block 224 proceeds to decision block 226.

At decision block 226, a determination is made whether recorded drift angle and, if not, whether the airplane lateral excursion from runway centerline can be estimated from the recorded flight data. If recorded drift angle is available, the logic proceeds to block 228. If drift angle is not available, but the airplane lateral excursion from runway centerline can be estimated from the recorded flight data, the logic proceeds to blocks 230 and 232.

At block 228, drift angle δ is preferably determined according to Equation 11 using input Euler angles φ, θ, ψ and estimated inertial speed information u, v, w. The logic then proceeds to block 234.

At blocks 230 and 232, $δ_F$ becomes the estimated runway excursion and δ becomes the integrated runway excursion. At block 230, the rate of runway excursion $\dot{δ}$ is determined preferably determined according to Equation 18 using Euler angles φ, θ, ψ, estimated inertial speed information u, v, w, and further the resulting traveling speed along the north direction and east direction $\dot{sx}$, $\dot{sy}$, respectively, and the input direction of the runway centerline relative to north, $ψ_{rw}$. At block 232, the rate of runway excursion $\dot{δ}$ is integrated to produce the integrated runway excursion δ. The logic then proceeds to block 234.

At block 234, an optimal control process is used to minimize the objective function of Equation 16 with respect to the constant bias corrections for load factors $Δn_X$, $Δn_Y$, $Δn_Z$ and inertial speeds u, v, w at $t=t_0$. The optimal control process involves comparing integrated altitude h, ground speed or airspeed vg and drift angle or runway excursion δ with recorded altitude $h_F$, ground speed or airspeed $vg_F$ and drift angle or runway excursion $δ_F$.

At decision block 236, the resulting gradient of objective function J with respect to the constant bias corrections for load factors $Δn_X$, $Δn_Y$, $Δn_Z$ and inertial speeds u, v, w at $t=t_0$ is evaluated to determine whether it is within acceptable parameters. In the preferred embodiment, the goal is to reduce the gradient of objection function J to as close to zero as possible given the imperfections inherent in the data input. If the resulting gradient of objective function J is within predetermined tolerances, the logic proceeds to block 238. If the resulting gradient of objection function J is not within predetermined tolerances, the logic returns to block 208, where the constant bias corrections for load factors $Δn_X$, $Δn_Y$, $Δn_Z$ and inertial speed information u, v, w are reestimated preferably with reference to the determined gradient of objective function J, and the iterative process repeats itself as described above.

At block 238, the process outputs kinematically consistent altitude h, ground speed or airspeed vg, drift angle or runway excursion δ, inertial speed information u, v, w and corrected load factors. The altitude h output is preferably the integrated altitude determined during the last iteration at block 216. The ground speed or airspeed vg output is preferably the integrated ground speed or airspeed determined during the last iteration at block 222 or 224. The drift angle or runway excursion 6 output is preferably the integrated drift angle or runway excursion determined during the last iteration at block 228 or 232. The inertial speeds u, v, w are preferable the inertial speeds determined during the last iteration at block 214. The kinematically consistent corrected load factors $n_{XCG}$, $n_{YVG}$, $n_{ZCG}$ (assuming accelerometer location correction) output are preferably calculated according to the following:

$$n_{XCG} = n_X + Δn_{XL} + Δn_X$$

$$n_{YCG} = n_Y + Δn_{YL} + Δn_Y$$

$$n_{ZCG} = n_Z + Δn_{ZL} + Δn_Z \qquad \text{Equation 19}$$

The constant load factors bias corrections for $Δn_X$, $Δn_Y$, $Δn_Z$ are preferably determined during the last iteration at block 208. If no accelerometer location correction is necessary, Equation 19 is simplified to the following:

$$n_{XC} = n_X + Δn_X$$

$$n_{YC} = n_Y + Δn_Y$$

$$n_{ZC} = n_Z + Δn_Z \qquad \text{Equation 20}$$

The precise ordering of the steps described above with respect to FIGS. 5A and 5B may vary without departing from the scope of the present invention. For example, the steps of inputting some or all of the determined angular data (block 200) and inputting recorded linear data (block 202) may be performed in a different order. The steps of estimating and updating constant bias corrections for load factors (block 208) and estimating and updating inertial speeds at $t=t_0$ (block 210) may be performed in a different order, and may be performed prior to any CG correction decision (block 204). The order of the decisions made in decision blocks 220 and 226, and actions taken dependent thereon, may be reversed. In yet another example, recorded linear data may be input into the system at any time prior to its use in block 234. In other words, the ordering of the above-mentioned process is constrained only by the timing of necessary inputs to effectuate formulaic determinations.

In alternative embodiments, less than all load factors or other linear data may be present, as is frequently the case with FDR data. Accordingly, the present invention provides alternative means for determining inertial data in situations when the preferred linear data is not available, including those describes below.

For example, longitudinal load factor data nx may not be available. In this embodiment, constant bias for lateral and normal load factor correction is assumed, and a time-varying adjustment is made for the longitudinal load factor. Equation 9 as used in the above-described process is accordingly simplified to $$J = \int_{t_o}^{t_f} \left\{ \left(\frac{h_f - h}{\Delta_h}\right)^2 + \left(\frac{vg_F - vg}{\Delta_v}\right)^2 + \left(\frac{\delta_F - \delta}{\Delta_\delta}\right)^2 + \left(\frac{\Delta n_x}{\Delta_{nxdt}}\right)^2 \right\} dt \quad \text{Equation 21}$$

The procedure described above with reference to FIGS. 5A and 5B applies in this embodiment with several modifications. At block 202, since the recorded longitudinal load factor $n_X$ is not available, the recorded $n_X$ is set to zero. At block 234, the optimal control process is used to minimize the objective function of Equation 21 with respect to the constant bias corrections for load factors $\Delta n_Y$, $\Delta n_Z$, inertial speeds u, v, w at t=$t_0$ and the time history of $\Delta \dot{n}_x$. At decision block 236, the resulting gradient of objective function J is evaluated with respect to the constant bias corrections for load factors $\Delta n_Y$, $\Delta n_Z$, inertial speeds u, v, w at t=$t_0$ and the time history of $\Delta \dot{n}_x$.

In yet an alternative embodiment, if recorded $n_X$ and recorded ground speed or airspeed is not available, Equation 9 as used in the above-described process is further simplified to $$J = \int_{t_o}^{t_f} \left\{ \left(\frac{h_F - h}{\Delta_h}\right)^2 + \left(\frac{\delta_F - \delta}{\Delta_\delta}\right)^2 + \left(\frac{\Delta \dot{n}_x}{\Delta_{nxdt}}\right)^2 \right\} dt \quad \text{Equation 22}$$

In this embodiment, the time varying corrections for load factors $\Delta n_X$ is preferably subject to a longitudinal force model that provides a longitudinal load factor constraint according to $$\Delta n_x = \frac{T + (C_L \sin\alpha - C_D \cos\alpha)\bar{q}S}{W} \quad \text{Equation 23}$$

where
- $C_L$ lift coefficient
- $C_D$ drag coefficient
- T thrust as a function of throttle position and flight condition
- $\bar{q}$ dynamic pressure
- S wing area
- W airplane weight Lift coefficient and drag coefficient are primarily a function of the aerodynamic angle of attack α as well as recorded or input flap setting, elevator, stabilizer, and flight condition information, where aerodynamic angle of attack is $$\alpha = \tan^{-1} \frac{w_a}{u_a} \quad \text{Equation 24}$$

and sideslip angle is $$\beta = \tan^{-1} \frac{v_a}{\sqrt{u_a^2 + w_a^2}}. \quad \text{Equation 25}$$

and where airspeed data $u_a$, $v_a$, $w_a$ (magnitude/direction or converted to body-axis components) is calculated using integrated inertial speed u, v, w and user-supplied wind speed $u_w$, $v_w$, $w_w$ according to the following:

$$u_a = u - u_w, \; v_a = v - v_w, \; w_a = w - w_w \quad \text{Equation 26}$$

The angles of attack and sideslip are used to estimate lift coefficient $C_L$, drag coefficient $C_D$ and side force coefficient $C_Y$ models provided by the user (described in further detail below).

In yet an alternative embodiment, lateral load factor data $n_Y$ may not be available. In this embodiment, constant bias for longitudinal and normal load factor correction is assumed, and a time-varying adjustment is made for the lateral load factor. Equation 9 as used in the above-described process is accordingly simplified to $$J = \int_{t_o}^{t_f} \left\{ \left(\frac{h_F - h}{\Delta_h}\right)^2 + \left(\frac{vg_F - vg}{\Delta_v}\right)^2 + \left(\frac{\delta_F - \delta}{\Delta_\delta}\right)^2 + \left(\frac{\Delta \dot{n}_Y}{\Delta_{nydt}}\right)^2 \right\} dt \quad \text{Equation 27}$$

The procedure described above with reference to FIGS. 5A and 5B applies in this embodiment with several modifications. At block 202, since the recorded lateral load factor $n_Y$ is not available, the recorded $n_Y$ is set to zero. At block 234, the optimal control process is used to minimize the objective function of Equation 27 with respect to the constant bias corrections for load factors $\Delta n_X$, $\Delta n_Z$, inertial speeds u, v, w at t=$t_0$ and the time history of $\Delta \dot{n}_Y$. At decision block 236, the resulting gradient of objective function J is evaluated with respect to the constant bias corrections for load factors $\Delta n_X$, $\Delta n_Z$, inertial speeds u, v, w at t=$t_0$ and the time history of $\Delta \dot{n}_Y$.

In yet an alternative embodiment, if recorded $n_Y$ and recorded drift angle and runway excursion is not available, Equation 9 as used in the above-described process is further simplified to $$J = \int_{t_o}^{t_f} \left\{ \left(\frac{h_F - h}{\Delta_h}\right)^2 + \left(\frac{vg_F - vg}{\Delta_v}\right)^2 + \left(\frac{\Delta \dot{n}_Y}{\Delta_{nydt}}\right)^2 \right\} dt \quad \text{Equation 28}$$

In this embodiment, the time varying corrections for load factor $\Delta n_Y$ is preferably subject to a lateral force model that provides a lateral load factor constraint according to $$\Delta n_Y = \frac{C_Y \bar{q} S}{W} \quad \text{Equation 29}$$

Side force coefficient $C_Y$ is primarily a function of aerodynamic sideslip angle as well as recorded rudder and flight conditions information. The definitions and discussion on various expressions as well as angle of attack, sideslip angle, airspeed and wind data information set forth above with reference to missing longitudinal load factor data applies in this embodiment.

In yet an alternative embodiment, normal load factor data $n_Z$ may not be available. In this embodiment, constant bias for longitudinal and lateral load factor correction is assumed, and a time-varying adjustment is made for the normal load factor. Equation 9 as used in the above-described process is accordingly simplified to $$J = \int_{t_o}^{t_f} \left\{ \left(\frac{h_F - h}{\Delta_h}\right)^2 + \left(\frac{vg_F - vg}{\Delta_v}\right)^2 + \left(\frac{\delta_F - \delta}{\Delta_\delta}\right)^2 + \left(\frac{\Delta \dot{n}_z}{\Delta_{nzdt}}\right)^2 \right\} dt \quad \text{Equation 30}$$

The procedure described above with reference to FIGS. 5A and 5B applies in this embodiment with several modifications. At block 202, since the recorded normal load factor $n_Z$ is not available, the recorded $n_Z$ is set to zero. At block 234, the optimal control process is used to minimize the objective function of Equation 30 with respect to the constant bias corrections for load factors $\Delta n_X$, $\Delta n_Y$, inertial speeds u, v, w at $t=t_0$ and the time history of $\Delta \dot{n}_Z$. At decision block 236, the resulting gradient of objective function J is evaluated with respect to the constant bias corrections for load factors $\Delta n_X$, $\Delta n_Y$, inertial speeds u, v, w at $t=t_0$ and the time history of $\Delta \dot{n}_Z$.

In yet an alternative embodiment, if recorded $n_Z$ and recorded altitude is not available, Equation 9 as used in the above-described process is further simplified to $$J = \int_{t_o}^{t_f} \left\{ \left(\frac{vg_F - vg}{\Delta_v}\right)^2 + \left(\frac{\delta_F - \delta}{\Delta_\delta}\right)^2 + \left(\frac{\Delta \dot{n}_z}{\Delta_{nzdt}}\right)^2 \right\} dt \quad \text{Equation 31}$$

In this embodiment, the time varying corrections for load factor $\Delta n_Z$ is preferably subject to a normal force model that provides a normal load factor constraint according to $$\Delta n_Z = \frac{(C_L \cos\alpha + C_D \sin\alpha)\bar{q}S}{W} \quad \text{Equation 32}$$

The definitions and discussion on various expressions as well as angle of attack, sideslip angle, airspeed and wind data information set forth above with reference to missing longitudinal load factor data applies in this embodiment.

Wind Analysis

Figure 6:
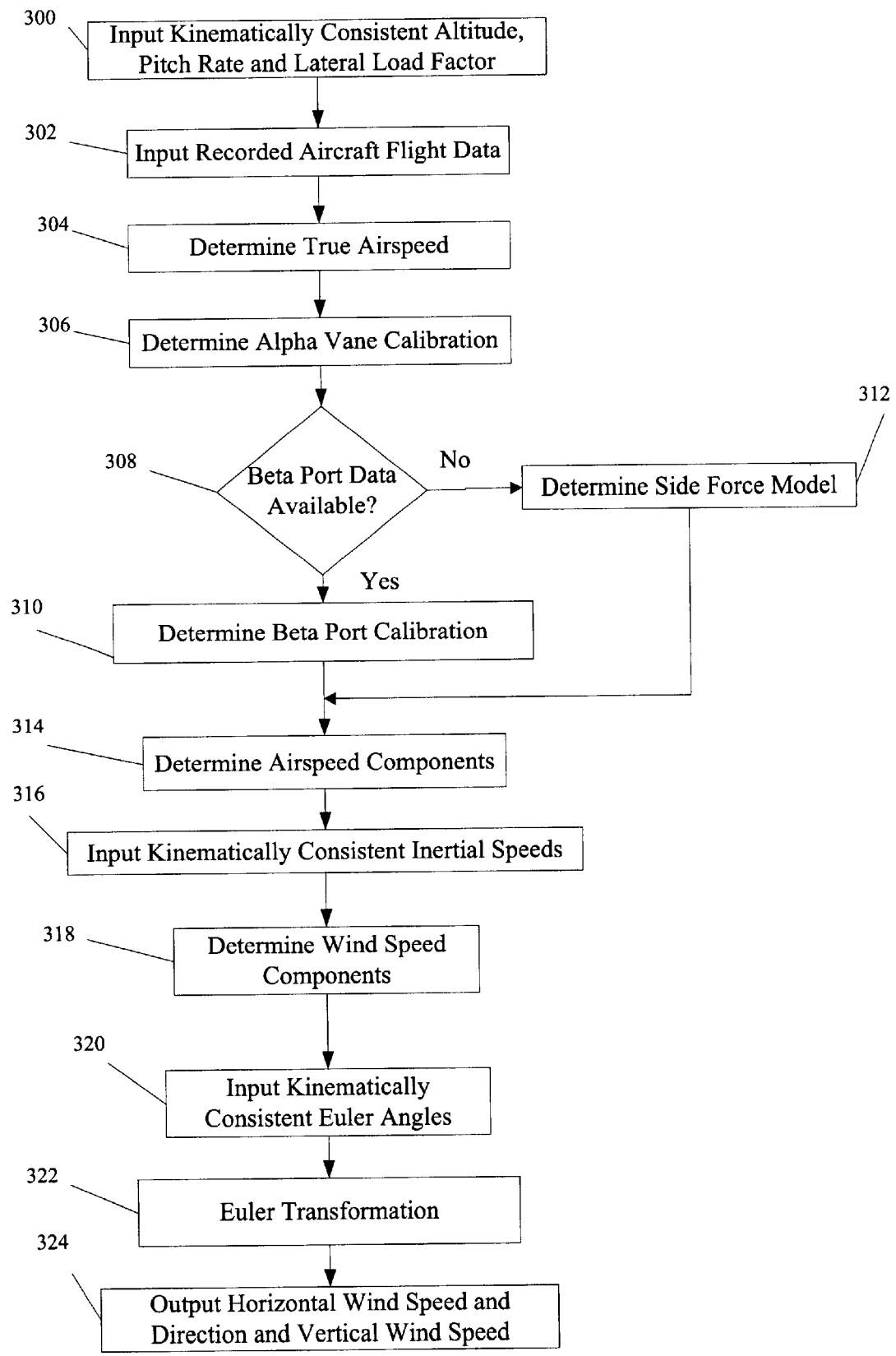
FIG. 6 illustrates a flowchart of a preferred embodiment of the wind analysis of the present invention incorporating rotational and translational kinematically consistent data.

In a preferred embodiment, the present invention performs a wind speed analysis to determine wind speed and direction associated with the aircraft movement. In the preferred embodiment, measured airspeed data is combined with alpha vane and beta port (sideslip) data or kinematically consistent load factors and inertial speed data provided by the translational kinematic consistency analysis. The wind analysis of the present invention is better understood with reference to FIG. 6.

At block 300, altitude h, pitch rate q and lateral load factor $n_Y$ are input. In the preferred embodiment, this is kinematically consistent data obtained as a result of the rotational and translational kinematic consistency analyses of the present invention, but this may be data obtained from any other reliable source. At block 302, aircraft flight data is recorded. This includes recorded calibrated airspeed $v_C$, temperature deviation from standard day, alpha vane data providing the airflow direction relative to the aircraft, and either recorded beta port or rudder deflection data.

At block 304 true airspeed $V_T$ is determined based on altitude h, recorded calibrated airspeed $v_C$ and temperature deviation from standard day. At block 306 alpha vane calibration occurs. This step determines the angle of attack $\alpha$ based on recorded alpha vane data and preferably the kinematically consistent pitch rate q from the kinematic consistency analyses of the present invention.

At decision block 308, a determination is made whether beta port or sideslip data is available. If beta port data is available, as is often the case with flight test data, the logic proceeds to block 310. At block 310, beta port calibration is performed. This step determines sideslip $\beta$ based on recorded beta port data. If beta port data is not available, as is frequently the case with FDR data, the logic of decision block 308 proceeds to block 312. At block 312, a side force model is applied to determine sideslip $\beta$ based on the kinematically consistent lateral load factor and recorded rudder deflection data. The logic of both blocks 310 and 312 proceeds to block 314.

At block 314, airspeed components $u_a$, $v_a$, $w_a$ are determined, preferably according to the following $$u_a = v_T \cos\alpha\cos\beta$$
$$v_a = v_T \sin\beta$$
$$w_a = v_T \sin\alpha\cos\beta \quad \text{Equation 33}$$

At block 316, inertial speeds u, v, w are input. These inertial speeds are preferably obtained from the kinematically consistency analyses of the present invention. At block 318, wind speed components $u_w$, $v_w$, $w_w$ are preferably determined based on input inertial speeds and the airspeed components $u_a$, $v_a$, $w_a$ determined at block 314 according to the following $$u_w = u - u_a, \quad v_w = v - v_a, \quad w_w = w - w_a \quad \text{Equation 34}$$

At block 320, Euler angles $\phi$, $\theta$, $\psi$ are input. These Euler angles are preferably obtained from the kinematically consistency analyses of the present invention. At block 322, an Euler transformation is applied based on the input Euler angles and the wind speed components determined at block 318.

At block 324, horizontal wind speed and direction data and vertical wind speed data is output.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for kinematically correcting flight data, comprising:
   inputting angular data, where angular data includes at least one of Euler angles or angular rates;
   generating first inertial data using optimal control to minimize the objective function associated with the angular data;
   inputting linear data, where linear data includes at least one of altitude, ground speed, airspeed, drift angle, runway excursion or load factors;
   generating second inertial data using optimal control to minimize the objective function associated with the linear data;
   inputting recorded air data; and
   determining wind speed and direction based on the first and second generated inertial data and the air data.

2. The method of claim 1, where:
   input angular data includes Euler angles; and
   generating first inertial data using optimal control to minimize the objective function associated with the angular data comprises determining constant bias to match Euler angles.

3. The method of claim 1, where:
   input angular data includes angular rates; and
   angular rates includes roll, pitch and yaw.

4. The method of claim 3, where generating first inertial data using optimal control to minimize the objective function associated with the angular data comprises determining angular acceleration to match roll, pitch and yaw.

5. The method of claim 1, where generating second inertial data using optimal control to minimize the objective function associated with the linear data comprises determining at least one of longitudinal acceleration, lateral acceleration or normal acceleration.

6. A computer program product for kinematically correcting flight data, comprising:

a component configured to input angular data, linear data and air data, where angular data includes at least one of Euler angles or angular rates and linear data includes at least one of altitude, ground speed, airspeed, drift angle, runway excursion or load factors;

a component configured to generate first inertial data using optimal control to minimize the objective function associated with the angular data;

a component configured to generate second inertial data using optimal control to minimize the objective function associated with the linear data; and a component configured to determine wind speed and direction based on the first and second generated inertial data and the air data.

7. The product of claim 6, where:

angular data includes Euler angles; and the component configured to generate first inertial data using optimal control to minimize the objective function associated with the angular data determines constant bias of angular rates to match Euler angles.

8. The product of claim 6, where:

input angular data includes angular rates; and angular rates includes roll, pitch and yaw.

9. The product of claim 8, where the component configured to generate first inertial data using optimal control to minimize the objective function associated with the angular data determines angular acceleration to match roll, pitch and yaw.

10. The product of claim 6, where the component configured to generate second inertial data using optimal control to minimize the objective function associated with the linear data determines at least one of longitudinal acceleration, lateral acceleration or normal acceleration.

11. A computer-based apparatus for kinematically correcting flight data, comprising:

a means for inputting angular data, where angular data includes at least one of Euler angles or angular rates;

a means for generating first inertial data using optimal control to minimize the objective function associated with the angular data;

a means for inputting linear data, where linear data includes at least one of altitude, ground speed, airspeed, drift angle, runway excursion or load factors;

a means for generating second inertial data using optimal control to minimize the objective function associated with the linear data;

a means for inputting recorded air data; and a means for determining wind speed and direction based on the first and second generated inertial data and the air data.

\* \* \* \* \*